(12) United States Patent
Deguchi et al.

(10) Patent No.: US 7,707,172 B2
(45) Date of Patent: Apr. 27, 2010

(54) HUMAN RELATIONSHIPS REGISTERING SYSTEM, METHOD AND DEVICE FOR REGISTERING HUMAN RELATIONSHIPS, PROGRAM FOR REGISTERING HUMAN RELATIONSHIPS, AND MEDIUM STORING HUMAN RELATIONSHIPS REGISTERING PROGRAM AND READABLE BY COMPUTER

(75) Inventors: Hikaru Deguchi, Tokyo (JP); Kenichi Ninomiya, Tokyo (JP)

(73) Assignees: Mekiki Co., Ltd., Tokyo (JP); Mekiki Creates Co., Ltd., Tokyo (JP)

( * ) Notice: Subject to any disclaimer, the term of this patent is extended or adjusted under 35 U.S.C. 154(b) by 0 days.

(21) Appl. No.: 12/265,413

(22) Filed: Nov. 5, 2008

(65) Prior Publication Data

US 2009/0070132 A1    Mar. 12, 2009

Related U.S. Application Data

(60) Continuation of application No. 11/073,524, filed on Mar. 8, 2005, now Pat. No. 7,493,342, which is a division of application No. 09/978,030, filed on Oct. 17, 2001, now Pat. No. 6,879,985.

(30) Foreign Application Priority Data

Oct. 17, 2000    (JP)    ............... 2000-316496
Oct. 9, 2001    (JP)    ............... 2001-311528

(51) Int. Cl.
*G06F 17/00* (2006.01)
(52) U.S. Cl. .................. 707/607; 707/609; 707/687; 707/705
(58) Field of Classification Search .......... 707/600–789
See application file for complete search history.

(56) References Cited

U.S. PATENT DOCUMENTS 6,073,138 A    6/2000    de L'Etraz et al.

(Continued)

FOREIGN PATENT DOCUMENTS

JP    07-129684    5/1995

(Continued)

OTHER PUBLICATIONS

Nikkei PC Beginners 21, Create a Mailing List With Your New Friends!, 2000, vol. 8, pp. 82-89 (with English Abstract and Partial English Translation).

(Continued)

*Primary Examiner*—Isaac M Woo
(74) *Attorney, Agent, or Firm*—Oblon, Spivak, McClelland, Maier & Neustadt, L.L.P.

(57) ABSTRACT

To provide a human relationships registering system, a method and a server for registering human relationships, a program for registering human relationships, and a medium storing human relationships registering program and readable by a computer, all of which are used to establish wide and close relationships with members having a variety of occupations or engaged in various technical fields and to obtain expert knowledge or information. The human relationships registering system comprises first data processing units 2 and 3 including sections for receiving personal data of a new member, and a second data processing unit including a section for storing the received personal data. The second data processing unit stores the personal data of the new member in correlation to an existing member when the existing member confirms the new member.

64 Claims, 10 Drawing Sheets

U.S. PATENT DOCUMENTS

| | | |
|---|---|---|
| 6,175,831 B1 | 1/2001 | Weinreich et al. |
| 6,269,369 B1 | 7/2001 | Robertson |
| 6,324,541 B1 | 11/2001 | de L'Etraz et al. |
| 6,363,394 B1 | 3/2002 | Rajarajan et al. |
| 6,714,916 B1 | 3/2004 | Robertson et al. |
| 6,735,568 B1 | 5/2004 | Buckwalter et al. |
| 7,039,639 B2 | 5/2006 | Brezin et al. |
| 7,325,012 B2 | 1/2008 | Nagy |
| 7,613,695 B1 | 11/2009 | Solomon et al. |
| 2002/0059201 A1 | 5/2002 | Work |
| 2002/0091667 A1 | 7/2002 | Jaipuria et al. |

FOREIGN PATENT DOCUMENTS

| | | |
|---|---|---|
| JP | 3052673 | 9/1998 |
| JP | 11-066082 | 3/1999 |
| JP | 2000-057166 | 2/2000 |
| JP | 2000-057225 | 2/2000 |
| JP | 2000-066970 | 3/2000 |

OTHER PUBLICATIONS

Ogata, et al., PeCo-Mediator. Development and Modelling of a Supporting System for Sharing and Handling Personal Connections, Transactions of Information Processing Society of Japan, vol. 36, No. 6, Jun. 1995, pp. 1299-1309 (with English Abstract and Partial English Translation).

Aiso, et al., Development of a Supporting System for Group Use of Personal Connections Using Collaborative Agents, Technical Report of The Institute of Electronics, Information and Communication Engineers, OFS96-15, May, 1996, pp. 31-36 (with English Abstract and Partial English Translation).

Wikipedia, the Free Encyclopedia, Social Network Service, Jan. 11, 2008, pp. 1-6; http://en.wikipedia.org/wiki/Social_network_service.

Wikipedia, the Free Encyclopedia, List of Social Networking Websites, Jan. 11, 2008, pp. 1-5; http://en.wikipedia.org/wiki/Social_networking_websites.

Leonard N. Foner, "Yenta: A Multi-Agent, Referral-Based Matchmaking System", pp. 301-307.

Jon Kleinberg, "The Small-World Phenomenon: An Algorithmic Perspective", Cornell Computer Science Technical Report, Oct. 1999, pp. 1-14.

Fig. 4

```
            NEW MEMBER'S PAGE

NAME      [_____]~32
   INTRODUCER   [_____]~33
   OCCUPATION   [_____]~34                ~31
     ADDRESS    [_____]~35
    PHONE NO.   [_____]~36
   E-MAIL ADD.  [_____]~37
   TECH. FIELD  [_____]~38
                     PASSWORD  [_____]~40
   [ OK ]~39
```

Fig. 5

A NEW MEMBER MR. OR MS ○○○○ WISHES YOU
TO INTRODUCE HIM OR HER TO THE SYSTEM.

PLEASE CLICK "CONFIRMATION" BUTTON
AFTER YOUR CONFIRMATION.

NEW MEMBER

NAME [ ] ~ 4 2

OCCUPATION [ ] ~ 4 3

TECH. FIELD [ ] ~ 4 4

[ CONFIRMATION ] ~ 4 5

| | ID-M | ID-I | ID-D | ID-S |
|---|---|---|---|---|
| ID-M | — | 1.0 | 0.5 | 0.25 |
| ID-I | 1.0 | — | 1.0 | 0.5 |
| ID-D | 0.5 | 1.0 | — | 1.0 |
| ID-S | 0.25 | 0.5 | 1.0 | — |

(b)

| | ID-M | ID-I | ID-D | ID-S |
|---|---|---|---|---|
| ID-M | — | 1.0 | 1.0 | 0.5 |
| ID-I | 1.0 | — | 1.0 | 0.5 |
| ID-D | 1.0 | 1.0 | — | 1.0 |
| ID-S | 0.5 | 0.5 | 1.0 | — |

(c)

| | ID-M | ID-I | ID-D | ID-S | ID-N |
|---|---|---|---|---|---|
| ID-M | — | 1.0 | 1.0 | 0.5 | 0.5 |
| ID-I | 1.0 | — | 1.0 | 0.5 | 1.0 |
| ID-D | 1.0 | 1.0 | — | 1.0 | 0.5 |
| ID-S | 0.5 | 0.5 | 1.0 | — | 0.25 |
| ID-N | 0.5 | 1.0 | 0.5 | 0.25 | — |

Fig. 10

| ID CODES | NAMES | INTRODUCERS | TECH. FIELDS | ... |
|---|---|---|---|---|
| ID-M | M | I | LAW | |
| ID-I | I | D | LAW | |
| ID-D | D | — | BUSINESS ADMINISTRATION | |
| ID-S | S | D | EDUCATION | |

HUMAN RELATIONSHIPS REGISTERING SYSTEM, METHOD AND DEVICE FOR REGISTERING HUMAN RELATIONSHIPS, PROGRAM FOR REGISTERING HUMAN RELATIONSHIPS, AND MEDIUM STORING HUMAN RELATIONSHIPS REGISTERING PROGRAM AND READABLE BY COMPUTER

CROSS-REFERENCE TO RELATED APPLICATIONS

This application is a continuation application of U.S. application Ser. No. 11/073,524, filed Mar. 8, 2005, which is a division of U.S. application Ser. No. 09/978,030, filed Oct. 17, 2001 which is now U.S. Pat. No. 6,879,985 issued Apr. 12, 2005 which is based upon and claims the benefit of priority from prior Japanese Patent Application Nos. 2000-316496, filed on Oct. 17, 2000; and 2001-311528, filed on Oct. 9, 2001, the entire contents of each of which are incorporated herein by reference.

BACKGROUND OF THE INVENTION

1. Field of the Invention

The invention relates to a human relationships registering system, a method and a server for registering human relationships, a program for registering human relationships, and a medium storing human relationships registering program and readable by a computer, all of which are used to establish wide and close human relationships.

2. Description of the Related Art

Up to now, there has been no efficient system or method which is usable in order to get acquainted with specialists in various particular fields and obtain expert knowledge or information.

Each person has been required to make every effort in order to establish wide and close relationships with a great number of people. There has been no system which actively supports such a person.

SUMMARY OF THE INVENTION

Problems to be Solved by the Invention

The present invention is intended to provide a human relationships registering system, a method and a server for registering human relationships, a program for registering human relationships, and a medium for storing human relationships registering program and readable by a computer, all of which are used to establish wide and close human relationships.

Further, the invention aims at providing a human relationships registering system, a method and a server for registering human relationships, a program for registering human relationships, and a medium storing human relationships registering program and readable by a computer, all of which are used to establish wide and close relationships with specialists in various particular fields and obtain expert knowledge or information.

Means to Solve the Problems

In order to accomplish the foregoing object of the invention, there is provided a human relationships registering system comprising:

a first data processing unit including a section for inputting personal data of new members;

and a second data processing unit including a section for storing the personal data of the new members, and storing the personal data of the new members by confirming relationships of the new members with existing members and correlating the new members with the existing members.

With the foregoing system, new members are not registered until they are confirmed by existing members, so that it is possible to maintain reliable human relationships between members. Further, new members are correlated to existing members, which enable members to know their relationships with one another and create their own human relationships data. A personal computer or a server computer is applicable as a data processing unit in order to easily create human relationships data of a great number of members.

A further human relationships registering system comprises a first data processing unit connected to the Internet and having an input section, and a second data processing unit connected to the first data processing unit via the Internet, registering names of members received via the input section and storing data concerning the members. The data of new members received via the first data processing unit are confirmed by existing members, and are registered thereafter. The second data processing unit stores the new members in correlation with the existing members.

In this system, the first and second data processing units are provided at different locations and are connected via the Internet, which enables a number of members can gain access to the processing units from any location in order to register themselves. Therefore, this system is very convenient to use.

In the foregoing case, new members may be registered after they confirm their own data.

It is preferable to store data concerning occupations of new members to be registered. This is effective in enabling members to know specialists in various particular fields and obtain expert knowledge or information. In short, human relationships data are usable as one of effective measures for carrying out business activities.

It is preferable to store relationships coefficients representing degrees of relationships between particular members who agree to establish human relationships therebetween, and store relationships coefficients of members who are related to the members who agree to establish human relationships. The relationships coefficients may be effective in establishing wide and close relationships between members in a variety of technical fields, and promoting personal influences and contribution to the society.

Relationships between members can be objectively known on the basis of the relationships coefficients.

It is preferable to get agreement between existing members using e-mails. For this purpose, e-mails may be exchanged between members when it is necessary to establish relationships between them. In such a case, members may get acquainted with other members even when they do not know of one another directly. This is effective in increasing the relationships coefficients.

The first data processing unit has a display to indicate a number of members and personal data thereof. The display shows human relationships data between members out of basic data in which new members are correlated with existing members. When a particular member is specified by the input section of the first data processing unit, the display preferably shows the specified member in such a manner that it is correlated to particular existing members.

A method of registering human relationships comprises a first data processing step for connecting to the Internet and receiving data via the Internet, and a second data processing step for registering a plurality of members' names received in the first data processing step and storing personal data of the members. In the second data processing step, data of a new member received via the Internet are registered after referring them back to an existing member, so that the new member's data are stored as basic data in correlation with the existing member.

This method is easily and effectively applicable to and used by the human relationships registering system which operates via the Internet.

In the foregoing method, new members are preferably registered after they confirm their own data. Further, it is preferable to store data concerning occupations, technical fields and so on of the new members. Still further, when relationships are established between existing members upon their agreement, it is preferable to store relationships coefficients therebetween and relationships coefficients of members related to the existing members. The agreement between particular existing members is preferably reached by exchanging-mails.

The registered human relationships data are preferably used in the following steps:

creating human relationships data on the basis of basic data in which a plurality of members are correlated; indicating personal data of members;

and indicating the created human relationships data.

In this case, it is preferable to select a particular member in the first data processing step, and to indicate members who are correlated to the selected particular member as well as human relationships data.

In order to use the registered human relationships data, a member inputs his or her identification code in the first data inputting step. Once identified, the member is allowed to gain access to his or her registration and personal data. This prevents the foregoing data from being infinitely retrieved by members, and protects the data.

As another way of using the registered data, a member may specify a particular occupation and/or technical field in order to indicate members classified in the specified occupation and/or technical field. Therefore, the member can easily retrieve data of the desired members out of the human relationships data.

In a still further way of using the registered data in which relationships coefficients between members are stored, a member specifies a particular member in the first data processing step, and indicates not only the human relationships data of the specified member but also those of the members correlated to the specified member and the relationships coefficients between the indicated members. This enables the member to easily know the relationships between the members and the relationships coefficients between them. In this case, it is also possible to indicate the members with a particular occupation and/or in a particular technical field, and the members correlated to the foregoing members. It is also possible to indicate the members having the relationships coefficients above a certain value. Therefore, the member can easily find desired members.

BRIEF DESCRIPTION OF THE DRAWINGS

A more complete appreciation of the invention and many of the attendant advantages thereof will be readily obtained as the same becomes better understood by reference to the following detailed description when considered in connection with the accompanying drawings, wherein:

FIG. 4 shows an example of Web page used for registering a personal data of a new member at the human relationships registering system.

FIG. 5 shows an example of a Web page that an existing member uses for confirming a personal data of a new member.

FIG. 9 is a graph showing relationships coefficient between members which are stored in the server 1.

FIG. 10 shows an example of personal data stored in the server 1.

Figure 1:
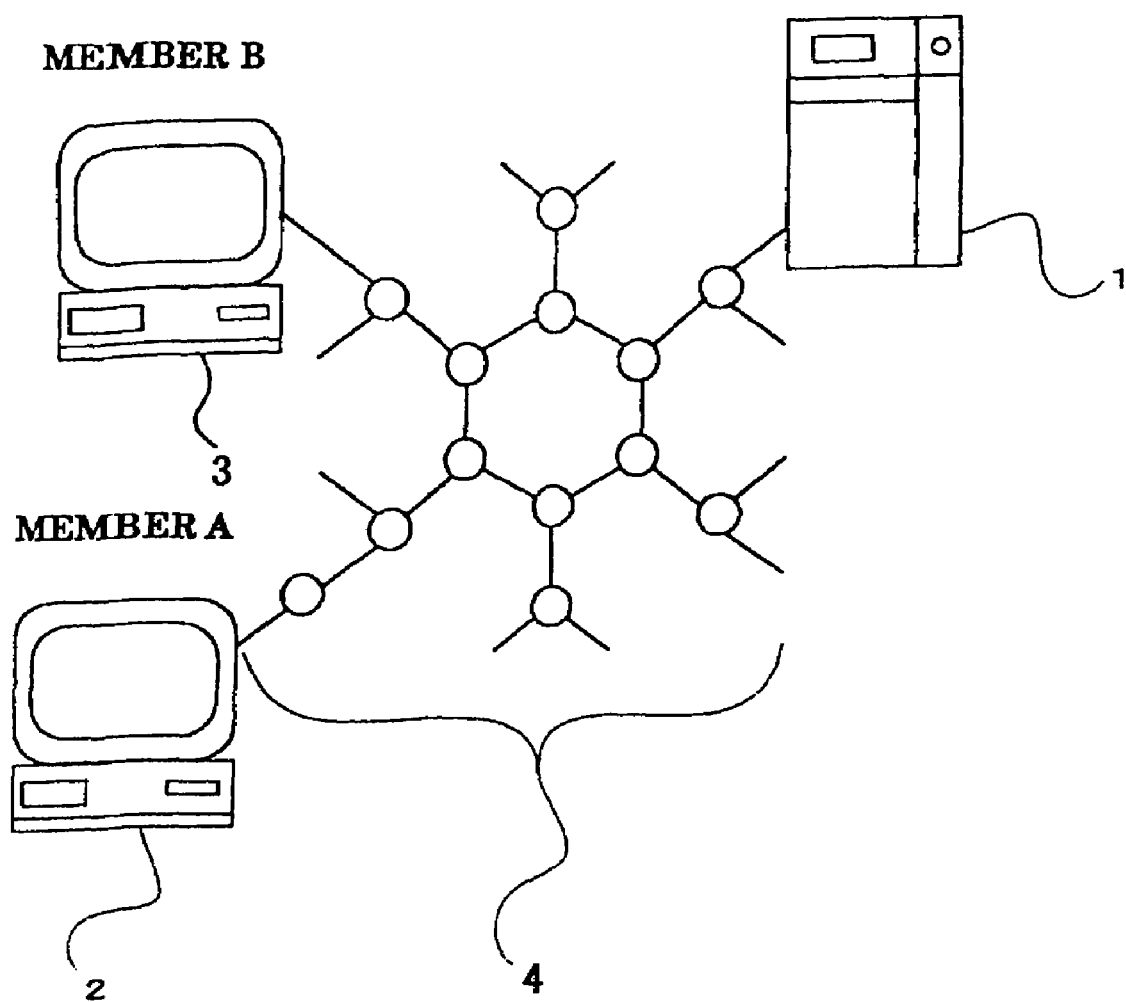
FIG. 1 schematically shows how a human relationships registering system is constituted via a general communication line such as an Internet.

DESCRIPTION OF REFERENCE NUMERALS 2, 3 personal computers as first data processing units
1 server as a second data processing unit
4 Internet

DETAILED DESCRIPTION OF THE PREFERRED EMBODIMENTS

Referring now to the drawings, wherein like reference numerals designate identical or corresponding parts throughout the several views.

The invention will be described with respect to a human relationships registering system shown in the accompanying drawings. FIG. 1 schematically shows that this system is constituted using the Internet.

Referring to FIG. 1, members are accessible via the Internet 4 to a server 1 as a second data processing unit from their personal computers 2 and 3 as first data processing units. Each personal computer comprises a computer body, an input section such as a keyboard, mouse and so on, a display, a memory such as a RAM, a hard disc, and so on. The server 1 is similar to the personal computer. The personal computer may include a printer in order to print data.

The server 1 provides a Web site for constituting the human relationships registering system, stores names and personal data of registered members, and has a database for retrieving the names and personal data of the registered members. The Web site of the server 1 is assigned an address for the Internet 4.

Each of the personal computers 2 and 3 stores a browser in the storage such as a hard disc in order to perform communications via the Internet 4. The personal computer 2 or 3 activates the browser and specifies an address, thereby connecting to the Web site of the human relationships registering system offered by the server 1.

An input section of the personal computer 2 or 3 transmits registering data to the server 1 via the Internet 4. When a registration keyword or the like is inputted, the server 1 retrieves necessary data. The retrieved data are indicated on a display of the personal computer 2 or 3.

Figure 2:
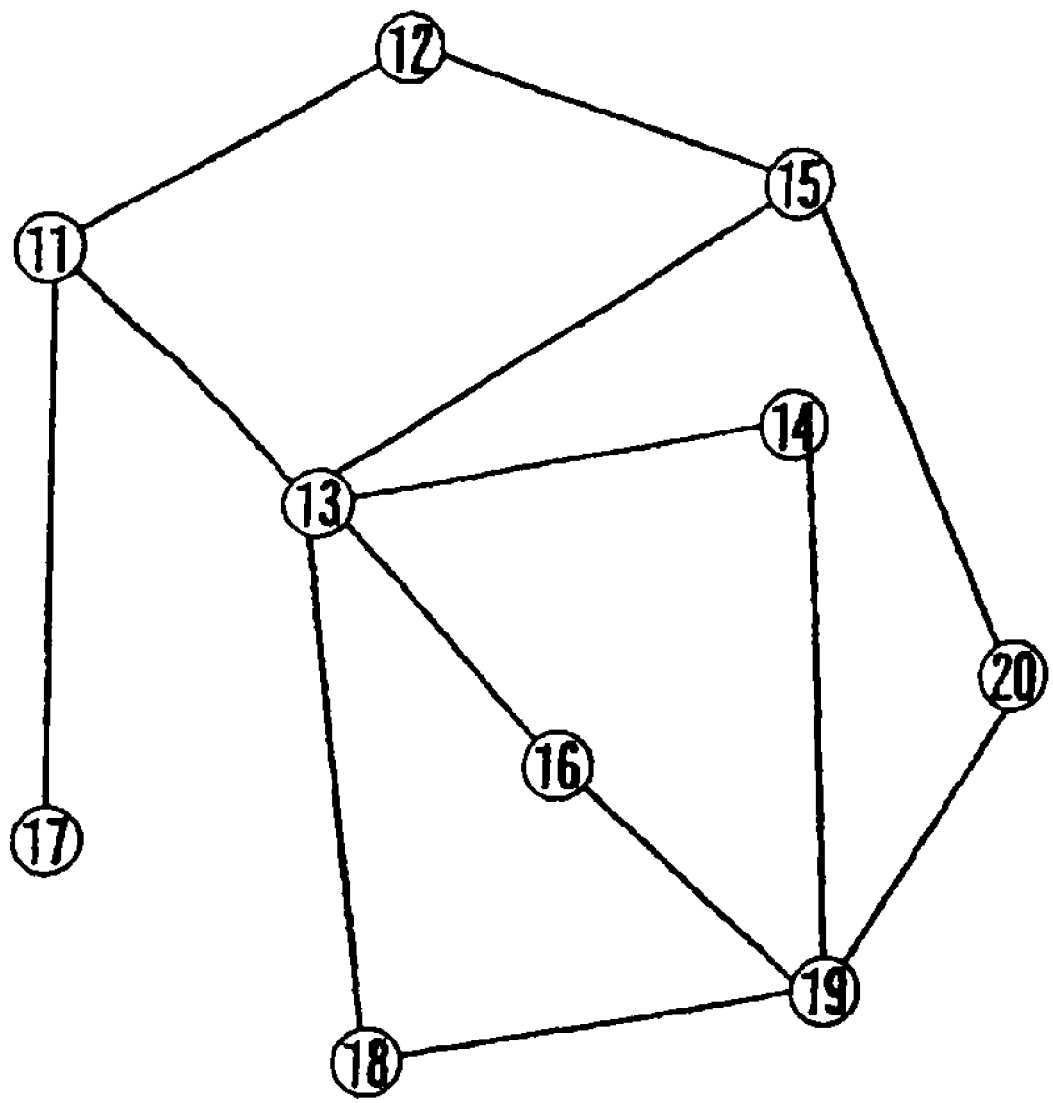
FIG. 2 is a schematic human relationships diagram created by the human relationships registering system.
Figure 3:
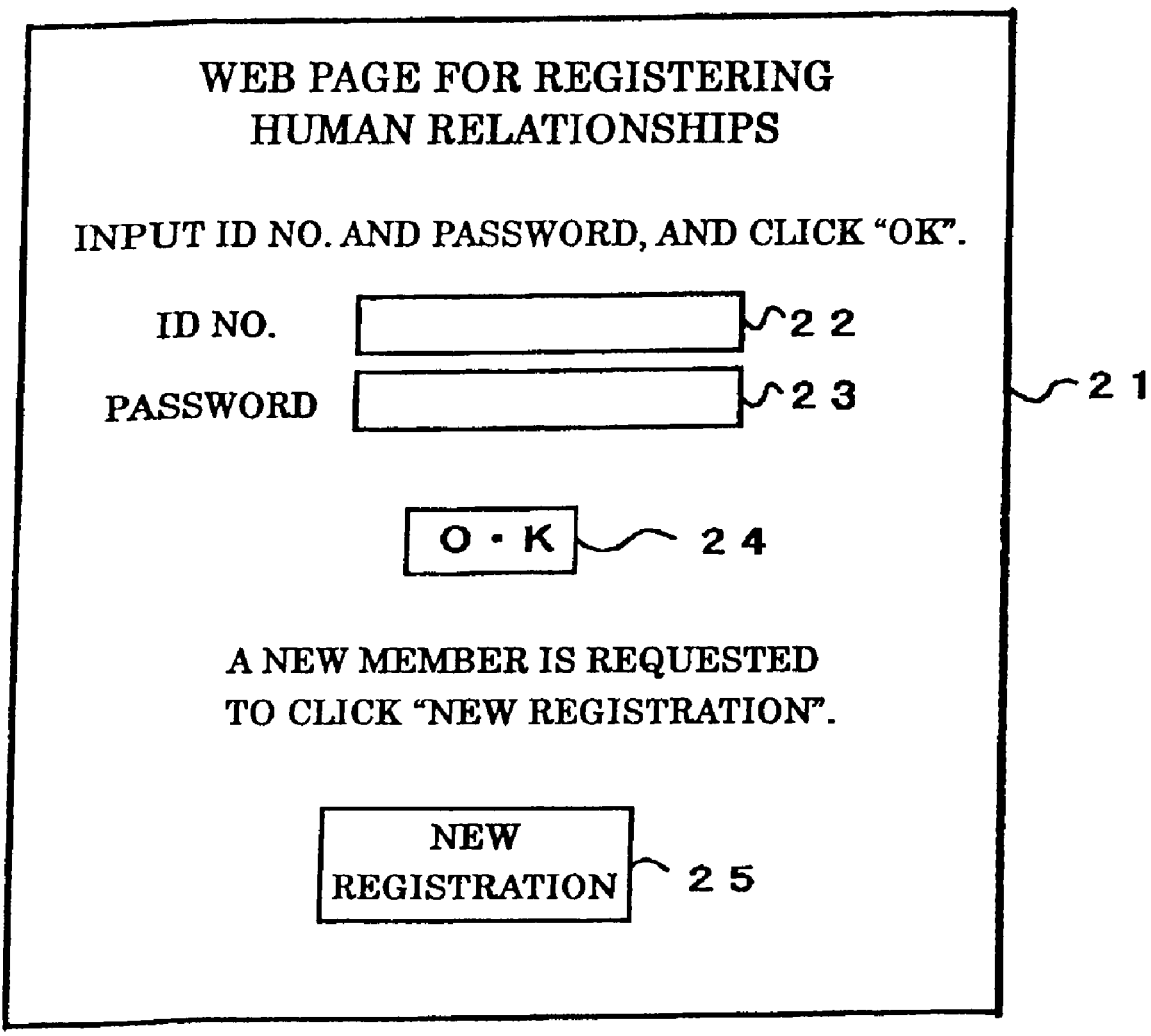
FIG. 3 shows an example of a Web page used for entering the Web site offered by the human relationships registering system.
Figure 6:
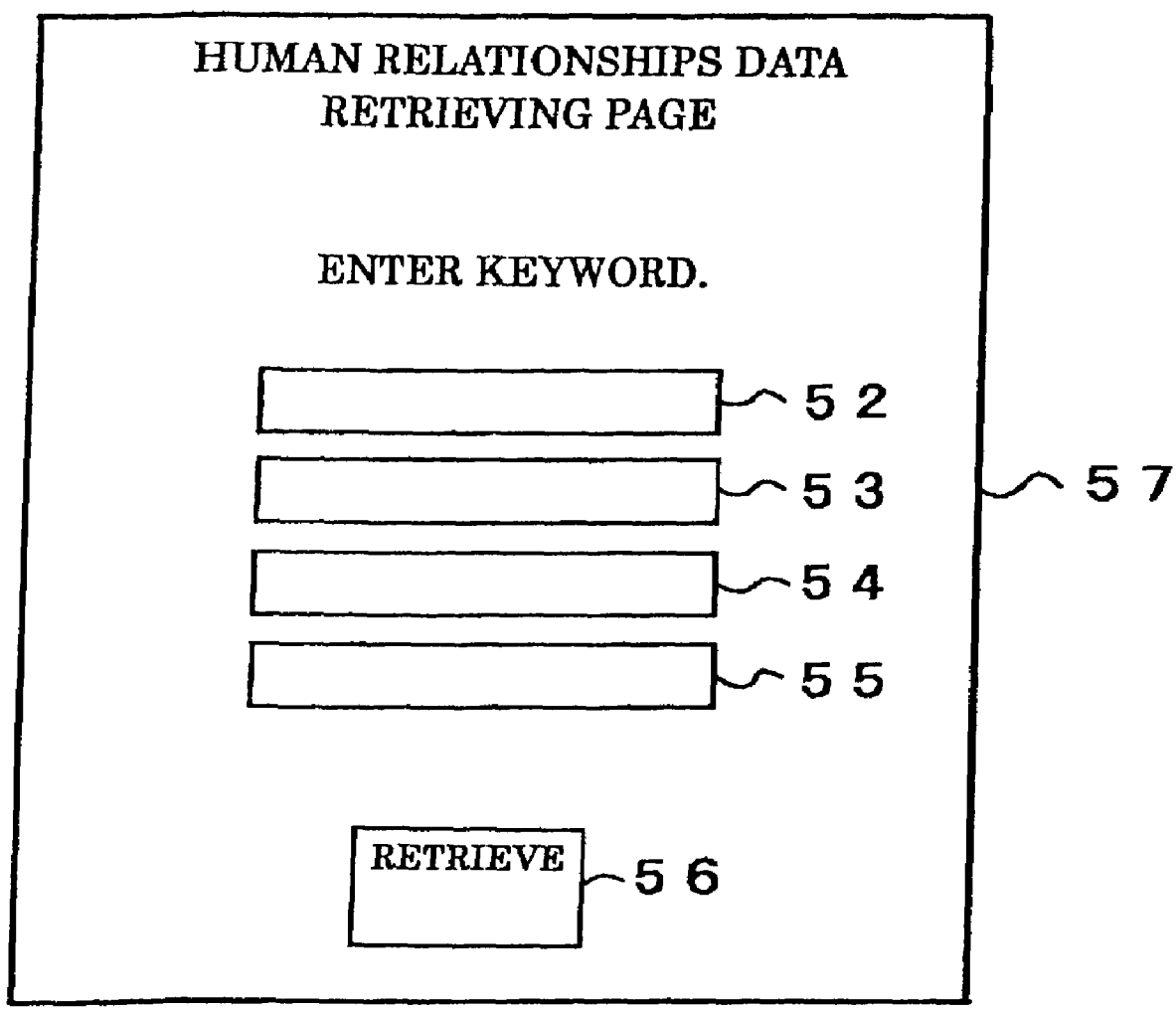
FIG. 6 shows an example of Web page used for retrieving data in the human relationships registering system.
Figure 7:
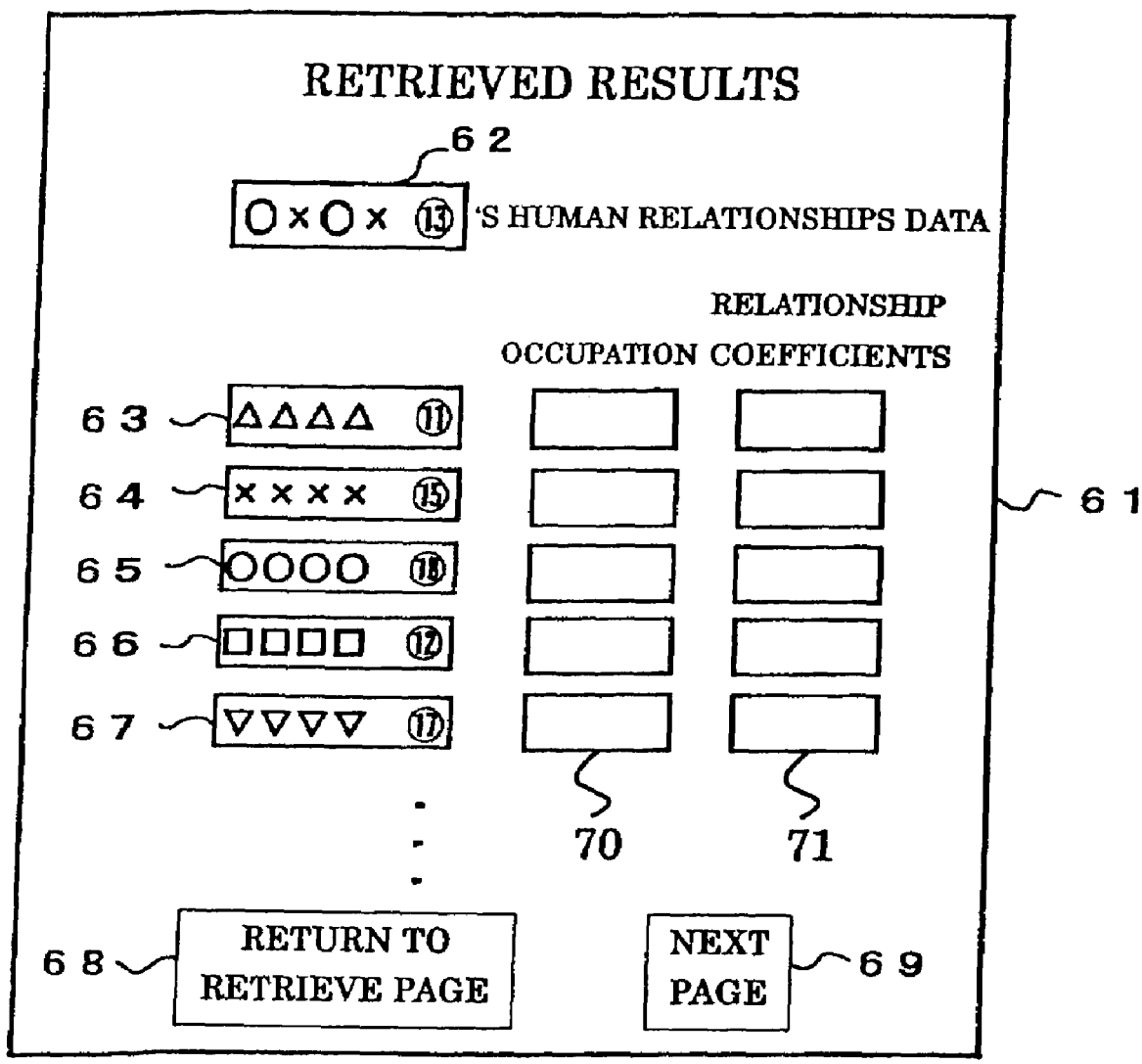
FIG. 7 shows an example of a Web page used for indicating retrieved data.

The use of the human relationships registering system will be described with reference to FIGS. 1 to 7. FIG. 2. Is a schematic diagram showing human relationships data which are created by the human relationships registering system. FIG. 3 shows an example of a Web page used for entering the Web site offered by the server 1. FIG. 4 shows an example of a Web page used for registering a personal data of a new member at the human relationships registering system. FIG. 5 shows an example of a Web page an existing member uses for confirming a personal data of a new member. FIG. 6 shows an example of a Web page used for retrieving data in the human relationships registering system. FIG. 7 is an example of a Web page used to show retrieved results.

A new member is registered in the human relationships registering system (called the "system" hereinafter) as shown in FIGS. 3 and 4. For convenience of description, it is assumed that an existing member A with the personal computer 2 (called the "computer 2") is going to introduce a new member B who has the personal computer 3 and wishes to enter the system.

When the new member B enters the system by himself or herself, he or she activates the browser of the computer 3, inputs a Web site address and gains access to the server 1 via the Internet 4. The computer 3 receives the Web page 21 as shown in FIG. 3 from the server 1 and indicates it on the display. The new member B clicks a new registration button 25 on the Web page 21, so that a signal is transmitted to the server 1. The computer 3 receives the Web page 31 as shown in FIG. 4 from the server 1 and indicates it on the display.

In FIG. 3, reference numeral 22 denotes a column to input an identification code, and reference numeral 23 denotes a column to input a password. By the way, the identification code and the password are inputted in the columns 22 and 23 when an existing member gains access to the server 1. Thereafter, the existing member can access the server 1 after pushing an OK button 24.

Referring to FIG. 4, the new member B enters his or her name 32, occupation 34, address 35, telephone number 36, e-mail address 37, technical field 38 and password 40 as well as the introducer's name 33. Confirming the entered data, the new member B clicks an OK button 39. Thereafter, the data will be transmitted to the server 1 via the Internet 4.

The computer 2 of the introducer A (i.e. the existing member A) receives Web page 41 as shown in FIG. 5 from the server 1 in response to an e-mail. The Web page 41 indicates the new member B's name, occupation, technical field in columns 42, 43 and 44. Confirming the contents, the introducer A clicks a confirmation button 45 on the Web page 41. Thereafter, a confirmation signal is sent to the server 1. In response to the confirmation signal, the server 1 stores the new member B's personal data and password in correlation with the introducer A. FIG. 4 shows only some examples of data to be stored with respect to the new member B. The following data may be added: a new member's age, academic backgrounds, occupational backgrounds, qualifications and so on. The entered data can be updated in the server 1 whenever there are changes after the registration.

Alternatively, the introducer A may register the new member B. In this case, the introducer A enters the personal data of the new member B (shown in FIG. 4) using his computer 2 in order to send them to the server 1. Thereafter, the computer 3 of the new member B receives the personal data from the server 1 by an e-mail. Confirming the received data, the new member B returns the confirmation signal to the server 1. Thus, the new member B will be registered in the server 1.

Further, when receiving an e-mail address of the new member B from the introducer A, the server 1 may send an e-mail to the new member B in order to urge the new member B to register his or her personal data. Upon receiving the personal data of the new member B, the server 1 stores the received data in correlation with the introducer A's name and so on.

The new member's data are confirmed by the introducer, and are stored in correlation with the introducer. The server 1 creates human relationships data and a human relationships diagram showing the human relationships on the basis of the relationships between the new member and the introducer. At the time of registration, a new member is assigned an identification code (ID No.).

The registered member can establish relationships with existing members, and obtain a relationship coefficient indicating degrees of relationships. For this purpose, members may send protocol e-mails to particular existing members. For instance, a sender may indicate that he or she respects or admires an existing member and wishes to establish relationships with the existing member, and so on. Such a protocol e-mail may be sent to the existing member as an e-mail via the server 1. In response to the protocol e-mail, the existing member may meet the sender's request, and establish the relationships with the sender. Therefore, the sender can be related to the receiver (i.e. the existing member), and obtain a relationships coefficient. As will be described later, the relationships coefficient is maximum when the relationships are directly established between members while the relationships coefficient becomes smaller when the relationships are indirectly established via other members. In other words, it is possible to objectively known a degree of relationships on the basis of the relationships coefficients.

The human relationships registering system shown in FIG. 1 and the human relationships diagram will be utilized as described hereinafter.

The server 1 creates a human relationships diagram as shown in FIG. 2 on the basis of the basic data in which members are registered in correlation with one another, and on the basis of agreements between members who have exchanged protocol e-mails. The server 1 sends the human relationships diagram to the computer 3. In FIG. 2, reference numerals 11 to 20 denote members, and lines denote members who are correlated with one another after exchanging protocol e-mails and agreeing to establish relationships. Further, relationships coefficients of the correlated members may be indicated in the human relationships diagram.

Relationships coefficients are updated each time new human relationships are established between registered members. The updated relationship coefficients are stored in the server 1. Therefore, latest relationships can be known even after relationships are changed between registered members.

Referring to FIG. 2, the member 13 is directly related to the members 11, 14, 15, 16 and 18 while the member 13 is indirectly related to the members 12, 17, 19 and 20. Further, it is possible to indicate all the members having relationships coefficients which are larger than a predetermined value. Still further, it is possible to indicate occupations and technical fields of members.

The following describe how the human relationships registering system is actually operated with reference to FIGS. 3, 6 and 7. It is assumed here that the member B activates a browser of the computer 3 and connects to the server 1 via the Internet 4. The Web page 21 (shown in FIG. 3) is indicated on the display of the computer 3. The member B enters his or her identification code (ID No.) and password on the columns 22 and 23 via the input section, and clicks the OK button 24. The input data are sent to the server 1, which confirms whether the identification code agrees with the password, and indicates a Web page 57 (shown in FIG. 6) on the display of the computer 3.

The identification codes are usually assigned to the members by the server 1. Alternatively, members' e-mail addresses may be used as identification codes. In order to know the human relationships of the member 13 (shown in FIG. 2), the member B enters the data concerning the member 13 on the columns 52 to 55, clicks a retrieve button 56. Then, the Web page 61 (shown in FIG. 7) is indicated on the display of the computer 3, and indicates on columns 63 to 67 the members 11, 15, 18, 12, 17 and so on who are related to the member 13. The occupations and relationship coefficients of the members 11, 15, 18, 12, 17 and so on are indicated on columns 70 and 71. In this case, it is possible to indicate only the members whose relationship coefficients exceed the predetermined value. A plurality of retrieval keywords may be input in the columns 52 to 55. Further, the Web page 61 may indicate technical fields and so on of the related members.

In order to retrieve data concerning members having particular occupations or engaged in particular technical fields, the member B enters keywords of the particular occupations or technical fields in the columns 52 to 55. The entered data are sent to the server 1, which retrieves desired data and indicates them on the computer 3. Alternatively, personal data of the retrieved members may be indicated by double clicking the columns 63 to 67.

Further, the relationship coefficients may be used as the keywords for the retrieval. In other words, it is possible to retrieve members who are related to a particular member (who may be a retrieving member) and have the relationships coefficient of a particular value.

According to the invention, it is possible to get acquainted with specialists in various particular fields by indicating occupations and technical fields of members with the human relationships diagram. Therefore, the invention is useful in order to obtain expert knowledge or information. In short, the human relationships diagram can be applied as one of effective business measures.

Referring to the indicated relationships coefficients of members, some members who are not directly related to a desired member shown in the human relationship diagram can find an introducer (another member) related to the desired member.

Figure 8:
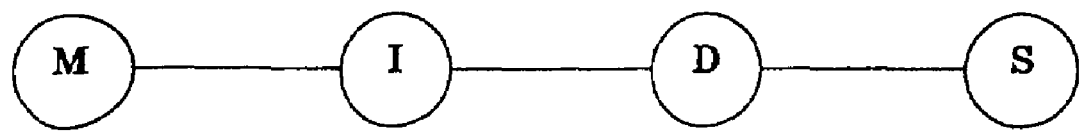
FIG. 8 is another schematic human relationships diagram created by the human relationships registering system.
Figure 8:
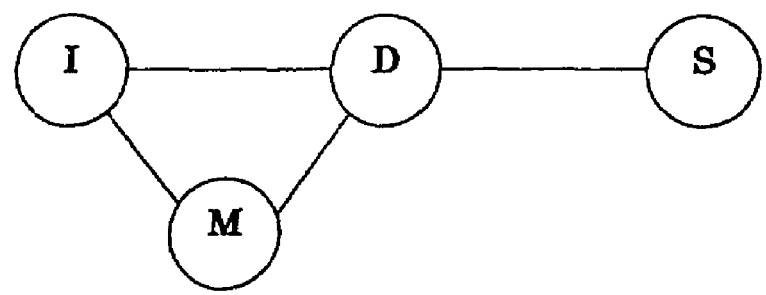
Figure 8:
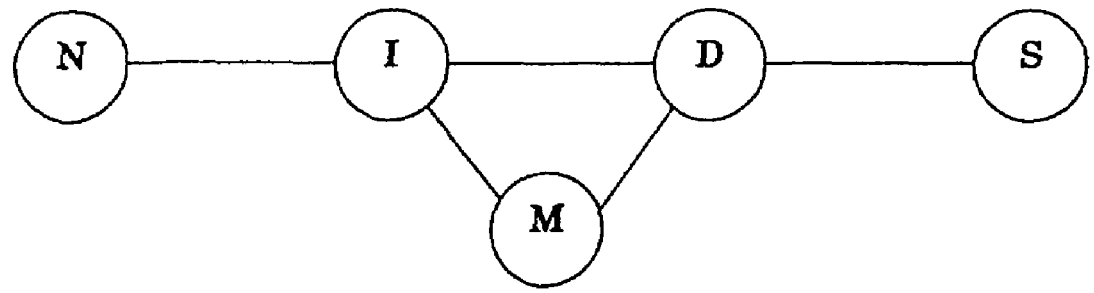

The relationships coefficients will be described in detail. FIGS. 8(a) to 8(c) show examples of human relationship diagrams created as human relationships data. The human relationships change from a state (a) to a state (b) and to a state (c). In these drawings, characters M, I, D, S and N denote members who are connected by lines when relationships are established therebetween.

Referring to FIG. 8(a), the member M is directly related to the member I, and is indirectly related to the members D and S. The term "directly" means that the relationship is established between the members M and I by exchanging the protocol e-mails therebetween. The term "indirectly" means that the member M has no direct relationship with the members D and S. In short, the member M is related to the members D and S via the member I.

In FIG. 8(b), the members M and D are directly related to each other by exchanging the protocol e-mails.

FIG. 8(c) shows that the member N is directly related to the member I by exchanging the protocol e-mails, and is indirectly related to the members M, D and S via the member I.

FIGS. 9(a) to 9(c) are tables showing examples of relationships coefficients of the members stored in the server 1. These tables correspond to FIG. 8(a) to 8(c), respectively. Characters ID-M, ID-I, ID-D, ID-S and ID-N denote the identification codes of the members M, I, D, S and N. The figures in FIGS. 9(a) to 9(c) are the relationship coefficients between members.

A maximum relationships coefficient "1.0" is assigned when members are directly related to each other. The relationships coefficient "1.0" is halved as the number of intermediate members increases. In short, a relationship coefficient "0.5" is assigned to a first member and a third member when a first member is related to a third member via a second member who is directly related to the first member. A minimum relationship coefficient "0.25" is assigned to a first member and a fourth member when the first member is related to the fourth member via the second member and the third member who is directly related to the second member.

Referring to FIG. 9(a), the relationships coefficients assigned to the member M are "1.0" based on direct relationship to the member I, "0.5" based on relationship to the member D via the member I, "0.25" based on relationship to the member S via the members I and D.

In the example shown in FIG. 9(b), if the member M is directly related to the member D (by exchanging the protocol e-mails), the relationships coefficient is changed to "1.0" between the members M and D. Further, the relationships coefficient is changed to "0.5" between the member M and the member S who is directly related to the member D. Needless to say, the relationship coefficient remains "1.0" between the member M and I who are directly related.

As shown in FIG. 9(c), the relationships coefficient "1.0" is assigned to the member N who is directly related to the member I. The relationships coefficient "0.5" is assigned to the member N who is related to the members D and M via the member I. The relationships coefficient "0.25" is assigned to the member N who is related to the member S via the members I and D.

As described above, it is possible to objectively know degrees of the human relationships on the basis of the relationship coefficients. The following describe a case in which the member S (shown in FIG. 8(a)) retrieves data of existing members using a keyword "law" representing a technical field.

FIG. 10 shows an example of personal data of the members M, I, D and S which are stored in the server 1. In response to the keyword "law" entered by the member S, the server 1 retrieves and outputs data concerning the members M and I who are practicing the law. In this case, the relationships coefficients between the member S and the members M and I (shown in FIG. 8(a)) may be also indicated. This enables the member S to check the presence of the member whose relationship coefficient is high to the member S. Further, the server 1 may indicate a human relationships diagram concerning the members S, M and I (shown in FIG. 8(a)). On the basis of the human relationships diagram, the member S who is retrieving the data can confirm the degree of relationships with the members M, I and himself or herself. For example, the member S can know that he or she is accessible to the member I via the member D who is directly related to the members I and S.

When a computer-readable recording medium such as a CD-ROM which stores the program for executing the human relationships registering method of the invention is used, another computer (not shown) can function as a server by reading the stored program similarly to the server 1.

Although the invention has been described with respect to one embodiment thereof, it will be understood that various modifications or alterations are possible without departing from the spirit of the present invention. For instance, a plurality of computers may be connected to a server using a dedicated line such as a LAN in place of the Internet. The Web pages are simply shown as examples, and may be configured as desired.

EFFECTS OF THE INVENTION

The invention is effective and useful when persons create human relationships data in order to get acquainted with specialists in various particular fields, and obtain expert knowledge or information.

According to the invention, the relationships coefficients are not assigned until relationships are established between members after mutual agreements are reached. The invention actively assists persons to establish wide and close relationships between members registered in the human relationships registering system.

Further, when some member retrieves data on existing members, relationship coefficients of the retrieving member and the existing members whose data are being retrieved are indicated. The retrieving member can select at least members who are close to him or her.

Obviously, numerous modifications and variations of the present invention are possible in light of the above teachings. It is therefore to be understood that within the scope of the appended claims, the invention may be practiced otherwise than as specifically described herein.

The invention claimed is:

1. An apparatus including a server configured to establish and update relationships between members registered to a human relationships registering system, the apparatus comprising:
   a database configured to store personal attribute information of the members, the personal attribute information including an identification code, a name, and relationship coefficients indicating respective degrees of relationship between the members;
   a message communicator configured to communicate a message from a first member to a second member and configured to communicate a response to the message from the second member to the first member, the response establishing a relationship between the first member and the second member;
   a database update unit configured to update, when the relationship is established between the first member and the second member, the relationship coefficients indicating respective degrees of relationship between (i) the first member and the second member, (ii) the first member and the members having relationships with the second member, and (iii) the second member and the members having relationships with the first member; and a data retriever configured to communicate an identity of target members having personal attribute information satisfying one or more key words of a search criterion, the one or more key words including at least a target relationship coefficient indicating the degree of relationship between the identified target members and a particular member.

2. The apparatus of claim 1, wherein the target relationship coefficient includes a range of values.

3. The apparatus of claim 1, wherein the data retriever is further configured to retrieve from the database the personal attribute information of common members having relationships with both a searcher and the identified target members, and to provide the searcher with the retrieved personal attribute information.

4. The apparatus of claim 3, wherein the data retriever is further configured to retrieve from the database the relationship coefficients indicating the respective degrees of relationship between the searcher and the common members.

5. The apparatus of claim 3, wherein the data retriever is further configured to retrieve from the database the relationship coefficients indicating the respective degrees of relationship between the searcher and the identified target members.

6. The apparatus of claim 3, wherein the data retriever is further configured to retrieve from the database the relationship coefficients indicating the respective degrees of relationship between the identified target members and the common members.

7. The apparatus of claim 1, wherein the message comprises an invitation to establish a relationship with the first member and the response comprises an acceptance of the invitation.

8. The apparatus according to claim 7, when the identification code comprises a member e-mail address.

9. The apparatus according to claim 1, wherein the search criteria are included in a Hyper Text Markup Language (HTML) request.

10. The apparatus according to claim 1, wherein the message and the response both comprise protocol e-mails.

11. The apparatus according to claim 1, wherein the relationship coefficient values are stored as a table and the database update unit updates the table.

12. The apparatus according to claim 1, wherein the particular member comprises the first member.

13. The apparatus according to claim 1, wherein the personal attribute information further comprises a specialized field.

14. The apparatus according to claim 1, wherein the identification code further comprises a username.

15. The apparatus according to claim 1, wherein the message from the first member includes personal attribute information of the first member.

16. A method of establishing and updating relationships between members registered to a human relationships registering system, the method comprising:
   storing personal attribute information of the members in a server coupled to a communication network, the personal attribute information including an identification code, a name, and relationship coefficients indicating respective degrees of relationship between the members;
   communicating a message from a first member to a second member utilizing the communication network;
   communicating a response to the message from the second member to the first member utilizing the communication network, the response establishing a relationship between the first member and the second member;
   updating the server coupled to the communication network, when the relationship is established between the first member and the second member, the relationship coefficients indicating the respective degrees of relationship between (i) the first member and the second member, (ii) the first member and the members having relationships with the second member, and (iii) the second member and the members having relationships with the first member; and
   communicating utilizing the communication network an identification of target members having personal attribute information satisfying one or more key words of a search criterion, the one or more key words including at least the relationship coefficient indicating the degree of relationship between the identified target members and a particular member.

17. The method of claim 16, wherein the target relationship coefficient includes a range of values.

18. The method of claim 16 further comprising:
retrieving from the database the personal attribute information of common members having relationships with both a searcher and the identified target members; and providing the searcher with the retrieved personal attribute information.

19. The method of claim 18 further comprising:
retrieving from the database the relationship coefficients indicating the respective degrees of relationship between the searcher and the common members.

20. The method of claim 18 further comprising:
retrieving from the database the relationship coefficients indicating the respective degrees of relationship between the searcher and the identified target members.

21. The method of claim 18 further comprising:
retrieving from the database the relationship coefficients indicating the respective degrees of relationship between the identified target members and the common members.

22. The method according to claim 16, wherein the message comprises an invitation to establish a relationship with the first member and the response comprises an acceptance of the invitation.

23. The method according to claim 16, wherein the search criteria are included in a Hyper Text Markup Language (HTML) request.

24. The method according to claim 16, wherein the message and the response comprise protocol e-mails.

25. The method according to claim 16, wherein the relationship coefficient values are stored as a table and the database update unit updates the table.

26. The method according to claim 16, wherein the particular member comprises the first member.

27. The method according to claim 16, wherein the personal attribute information further comprises a specialized field.

28. The method according to claim 16, wherein the identification code further comprises a username.

29. The method according to claim 16, wherein the message from the first member includes personal attribute information of the first member.

30. The method according to claim 16, wherein the communication network comprises Internet.

31. The method according to claim 16, wherein the search criteria are from the particular member.

32. A computer readable medium storing program code for causing a processor to execute processing to establish and update relationships between members registered to a human relationships registering system in a server coupled to a network, the processing comprising:
storing personal attribute information of the members in the server coupled to the network, the personal attribute information including an identification code, a name, a and relationship coefficients indicating respective degrees of relationship between the members;
communicating a message from a first member to a second member utilizing the network;
communicating a response utilizing the network to the message from the second member to the first member, the response establishing a relationship between the first member and the second member;
updating the server coupled to the communication network, when the relationship is established between the first member and the second member, the relationship coefficient indicating the respective degrees of relationship between (i) the first member and the second member, (ii) the first member and the members having relationships with the second member, and (iii) the second member and the members having relationships with the first member; and
communicating utilizing the communication network an identification of target members having personal attribute information satisfying one or more key words of a search criterion, the one or more key words including at least the relationship coefficient indicating the degree of relationship between the identified target members and a particular member.

33. An apparatus including a server configured to establish and update relationships between members registered to a human relationships registering system, the apparatus comprising:
a database for storing personal attribute information of the members, the personal attribute information including a member e-mail address, a name, username, and relationship coefficients indicating respective degrees of relationship between the members;
a message communicator for communicating a message to a second member inviting the second member to establish a relationship with a first member, and for communicating a message to the first member indicating that the second member has accepted the invitation, the acceptance establishing a relationship between the first member and the second member;
a database update unit for updating, when the relationship is established between the first member and the second member, the relationship coefficients indicating respective degrees of relationship between the first member and the second member; and
a data retriever for providing a particular member an identity of target members having personal attribute information satisfying one or more key words of a search criterion of the particular member, the one or more key words including at least a target relationship coefficient indicating the degree of relationship between the identified target members and the particular member.

34. The apparatus of claim 33, further comprising:
the data retriever is further configured to retrieve from the database the personal attribute information of common members having relationships with both the first member and the identified target members, and to provide the first member with the retrieved personal attribute information.

35. The apparatus of claim 34, wherein the data retriever is further configured to retrieve from the database the relationship coefficients indicating the respective degrees of relationship between the first member and the common members.

36. The apparatus according to claim 34, wherein the data retriever is further configured to retrieve from the database the relation coefficients indicating the respective degrees of relationship between the identified target members and common members.

37. The apparatus of claim 33, further comprising:
the data retriever is further configured to retrieve from the database the relationship coefficients indicating the respective degrees of relationship between the first member and the identified target members.

38. The apparatus according to claim 33, wherein the particular member comprises the first member.

39. The apparatus according to claim 33, wherein the message from the first member includes personal attribute information of the first member.

40. The apparatus according to claim 33, wherein the search criteria are included in a Hyper Text Markup Language (HTML) request.

41. The apparatus according to claim 33, wherein the message and the response both comprise protocol e-mails.

42. The apparatus according to claim 33, wherein the relationship coefficient values are stored as a table and the database update unit updates the table.

43. The apparatus according to claim 33, wherein the personal attribute information further comprises a specialized field.

44. The apparatus according to claim 33, wherein the identification code further comprises a username.

45. The apparatus according to claim 33, wherein the message from the first member includes personal attribute information of the first member.

46. The apparatus according to claim 33, wherein the database update unit for updating, when the relationship is established between the first member and the second member, further updates the relationship coefficients indicating respective degrees of relationship between the first member and the members having relationships with the second member and the second member and the members having relationships with the first member.

47. A method of establishing and updating relationships between members registered to a human relationships registering system, the method comprising:
   storing personal attribute information of the members on a web server coupled to a communication network, the personal attribute information including a member e-mail address, a name, a username, and relationship coefficients indicating respective degrees of relationship between the members;
   communicating a message utilizing the communication network from a first member to a second member inviting the second member to establish a relationship with a first member;
   communicating a message utilizing the communication network to the first member indicating the second member has accepted the invitation, the acceptance establishing a relationship between the first member and the second member;
   updating the server coupled to the communication network, when the relationship is established between the first member and the second member, the relationship coefficients indicating the respective degrees of relationship between the first member and the second member; and
   communicating to a particular member, utilizing the server coupled to the communication network, an identification of target members having personal attribute information satisfying one or more key words of a search criterion, the one or more key words including at least the relationship coefficient indicating the degree of relationship between the identified target members and a particular member.

48. The method of claim 47 further comprising:
   retrieving from the database the personal attribute information of common members having relationships with both the first member and the identified target members; and providing the first member with the retrieved personal attribute information.

49. The method of claim 48 further comprising:
   retrieving from the database the relationship coefficients indicating the respective degrees of relationship between the first member and the common members.

50. The method of claim 48 further comprising:
   retrieving from the database the relationship coefficients indicating the respective degrees of relationship between the identified target members and the common members.

51. The method of claim 47 further comprising:
   retrieving from the database the relationship coefficients indicating the respective degrees of relationship between the first member and the identified target members.

52. The method according to claim 47, wherein the message from the first member includes personal attribute information of the first member.

53. The method according to claim 47, wherein further updating the server coupled to the communication network, when the relationship is established between the first and second member, the relationship coefficients between the respective degrees of relationship between the first member and the members having relationships with the second member and the second member and the members having relationships with the first member.

54. A computer readable medium storing program code for causing a processor to execute processing to establish and update relationships between members registered to a human relationships registering system on a web server coupled to internet, the processing comprising:
   storing personal attribute information of the members in a server coupled to a communication network, the personal attribute information including a members e-mail address, a name, and relationship coefficients indicating respective degrees of relationship between the members;
   communicating a message utilizing the communication network to a second member inviting the second member to establish a relationship with a first member;
   communicating a message utilizing the communication network to the first member indicating the second member has accepted the invitation, the acceptance establishing a relationship between the first member and the second member;
   updating the server coupled to the communication network, when the relationship is established between the first member and the second member, the relationship coefficients indicating the respective degrees of relationship between the first member and the second member; and
   providing to a particular member, utilizing the server coupled to the communication network, an identification of target members having personal attribute information satisfying one or more key words of a search criterion, the one or more key words including at least the relationship coefficient indicating the degree of relationship between the identified target members and a particular member.

55. The computer readable medium storing program code according to claim 54, wherein the particular member comprises the first member.

56. The computer readable medium storing program code according to claim 54, wherein the communication network comprises Internet.

57. The computer readable medium according to claim 54, wherein the search criteria are included in a Hyper Text Markup Language (HTML) request.

58. The computer readable medium according to claim 54, wherein the message and the response comprise protocol e-mails.

59. The computer readable medium according to claim 54, wherein the relationship coefficient values are stored as a table and the database update unit updates the table.

60. The computer readable medium according to claim 54, wherein the personal attribute information further comprises a specialized field.

61. The computer readable medium according to claim 54, wherein the identification code further comprises a username.

62. The computer readable medium according to claim 54, wherein the message from the first member includes personal attribute information of the first member.

63. The computer readable medium according to claim 54, wherein the search criteria are from the particular member.

64. A computer readable medium storing program code according to claim 54, wherein further updating the server coupled to the communication network, when the relationship is established between the first member and the second member, the relationship coefficients indicating the respective degrees of relationship between the first member and the second members having relationship with the second member and the second member and the members having relationships with the first member.

* * * * *